(12) United States Patent
Colak

(10) Patent No.: US 12,726,133 B2
(45) Date of Patent: Sep. 1, 2026

(54) CONVERTER AND METHOD FOR DISCHARGING A CONVERTER

(71) Applicant: Maschinenfabrik Reinhausen GmbH, Regensburg (DE)

(72) Inventor: Ilknur Colak, Grenoble (FR)

(73) Assignee: REINHAUSEN GMBH, Regensburg (DE)

( * ) Notice: Subject to any disclaimer, the term of this patent is extended or adjusted under 35 U.S.C. 154(b) by 209 days.

(21) Appl. No.: 18/838,241

(22) PCT Filed: Jan. 30, 2023

(86) PCT No.: PCT/EP2023/052167

§ 371 (c)(1),
(2) Date: Aug. 14, 2024

(87) PCT Pub. No.: WO2023/156179

PCT Pub. Date: Aug. 24, 2023

(65) Prior Publication Data

US 2025/0149995 A1 May 8, 2025

(30) Foreign Application Priority Data

Feb. 17, 2022 (EP) .................................... 22157273

(51) Int. Cl.
*H02M 7/219* (2006.01)

(52) U.S. Cl.
CPC .................................. *H02M 7/219* (2013.01)

(58) Field of Classification Search
CPC .. H02M 7/219; H02M 7/4833; H02M 7/4835; H02M 1/322; H02M 7/493
USPC ........................................................ 363/127
See application file for complete search history.

(56) References Cited

U.S. PATENT DOCUMENTS 8,422,257 B2 * 4/2013 Asplund ................ H02M 7/49
363/43
9,496,799 B2 * 11/2016 Goetz .................. H02M 7/483
2015/0162848 A1 6/2015 Harnefors et al.
2021/0013816 A1 * 1/2021 Davidson ........... H02M 7/5388
2021/0152081 A1 5/2021 Anheuer et al.
(Continued)

FOREIGN PATENT DOCUMENTS

CN 210744737 U 6/2020
EP 3544163 A1 9/2019
EP 3595157 A1 1/2020
(Continued)

*Primary Examiner* — Yemane Mehari
(74) *Attorney, Agent, or Firm* — LEYDIG, VOIT & MAYER, LTD.

(57) ABSTRACT

A converter includes a controller coupled to a plurality of arms. Each arm includes cells coupled between first and second arm terminals. Each cell includes: first and second cell terminals, switching elements, and a capacitor. The switching elements selectively switch the cells between a state, in which the capacitor is connected to the cell terminals, and a second, capacitor bypass state. The cells are connected in series. The controller selectively operates in a mode to repeatedly switch each of the cells between the states such that the electric current is adjusted to match a predefined current reference value and that the capacitors are partially discharged until the electric voltage each capacitor provides is above a minimum voltage and below a maximum voltage.

14 Claims, 5 Drawing Sheets

(56) References Cited

U.S. PATENT DOCUMENTS

2023/0231495 A1* 7/2023 Leedham ............ H02M 7/4835
363/56.02

FOREIGN PATENT DOCUMENTS

EP 4084310 A1 * 11/2022 .............. H02M 1/36
JP 6534365 B2 6/2019

* cited by examiner

1

3
3
3
5
5
5
5
5
5
5
5
5
5
5
5
5
5
5
5
7
7
7
9
9
9
11
11
11
13
13
13

1
3
5
7
9
11
13
15
33
35
37

CONVERTER AND METHOD FOR DISCHARGING A CONVERTER

CROSS REFERENCE TO RELATED APPLICATIONS

This application is a U.S. National Phase application under 35 U.S.C. § 371 of International Application No. PCT/EP2023/052167, filed on Jan. 30, 2023, and claims benefit to European Patent Application No. EP 22157273, filed on Feb. 17, 2022. The International Application was published in English on Aug. 24, 2023, as WO 2023/156179 A1 under PCT Article 21(2).

FIELD

The present disclosure relates to a converter and a method for controlling the converter.

BACKGROUND

In the present context, a converter may include a plurality of cells, which may store electrical energy. In certain situations, for example, when the converter needs maintenance, the electrical energy stored in the converter needs to be dissipated such that the maintenance work can be performed safely.

Generally, a secure, reliable, and time efficient dissipation of the energy stored in the converter is desirable.

SUMMARY

In an embodiment, the present disclosure provides a converter that includes: a plurality of arms; and a controller coupled to the plurality of arms. Each of the arms includes: a first arm terminal; a second arm terminal; and a plurality of cells coupled between the first arm terminal and the second arm terminal. Each of the cells includes: a first cell terminal, a second cell terminal, switching elements, and a capacitor. The switching elements of each of the cells are adapted to selectively switch the respective cell between a first state, in which the capacitor is connected to the first cell terminal and second cell terminal, and a second state, in which the capacitor is bypassed. The cells are connected in series between the first arm terminal and the second arm terminal such that the first cell terminal of a first cell of the plurality of cells is connected to the first arm terminal and the second cell terminal of a second cell of the plurality of cells is connected to the second arm terminal. The controller is adapted to selectively operate in a mode in which the controller provides control signals to the switching elements to repeatedly switch each of the cells between the first state and second state in such a manner that the electric current in each of the arms is adjusted to match a respective predefined current reference value and that the capacitors are partially discharged until the electric voltage each capacitor provides is above a predefined minimum voltage reference value and below a predefined maximum voltage reference value.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
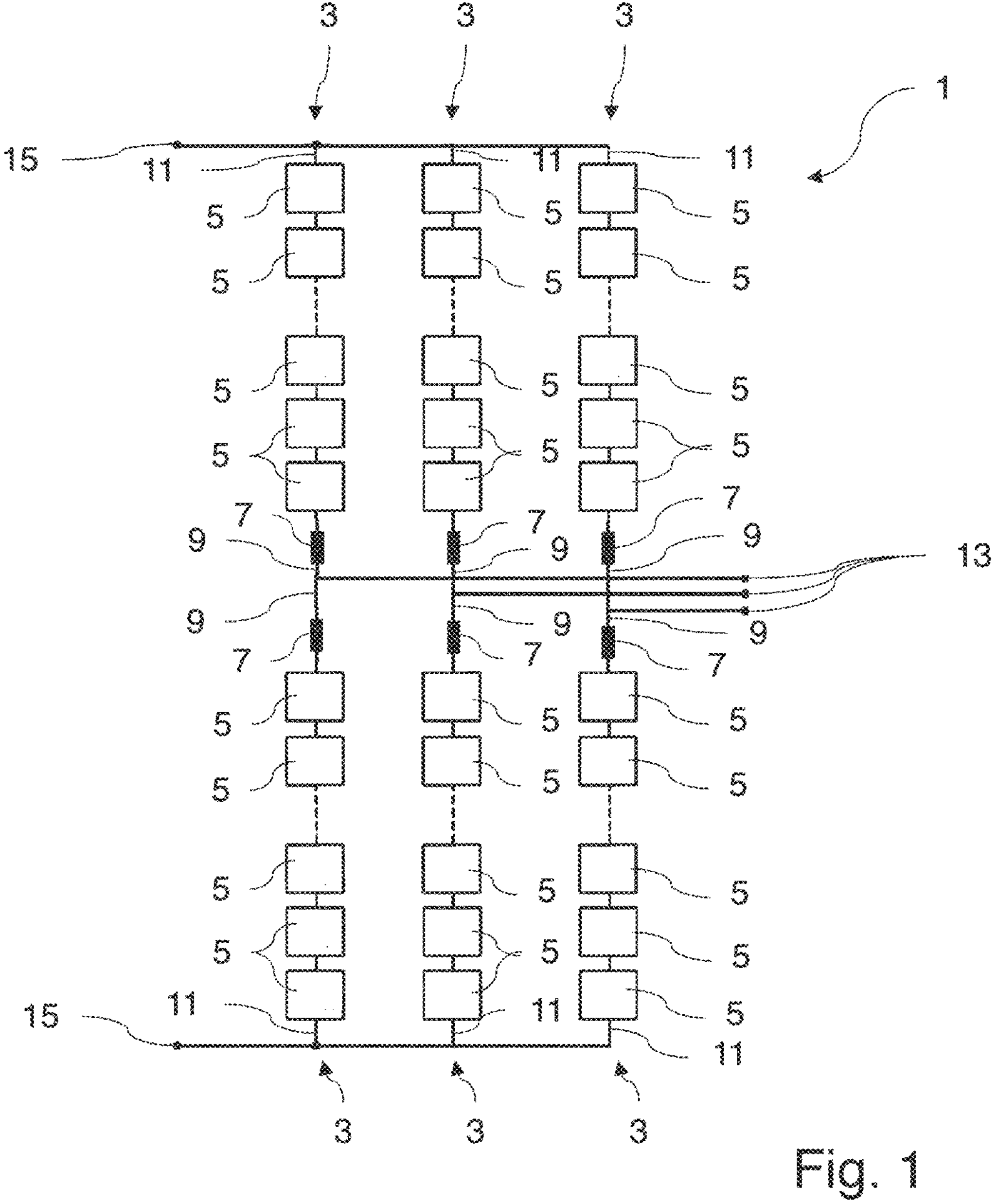
FIG. 1 schematically shows a first embodiment of a converter comprising a plurality of arms.

The present disclosure relates to a converter and a method for controlling the converter. The converter may include a plurality of arms and a controller coupled to the plurality of arms. Each of the arms comprises a first arm terminal, a second arm terminal, and a plurality of cells coupled between the first arm terminal and the second arm terminal. Each of the cells comprises a first cell terminal, a second cell terminal, switching elements, and a capacitor. The switching elements of each of the cells are adapted to selectively switch the respective cell between a first state, in which the capacitor is connected to the first and second cell terminals, and a second state, in which the capacitor is bypassed. The cells are connected in series between the first arm terminal and the second arm terminal such that the first cell terminal of a first cell of the plurality of cells is connected to the first arm terminal and the second cell terminal of a second cell of the plurality of cells is connected to the second arm terminal.

Aspects of the present disclosure are directed to providing a secure, reliable, and time efficient dissipation of the energy stored in the converter.

According to a first aspect of the present disclosure, a converter comprises a plurality of arms and a control unit coupled to the plurality of arms. Each of the arms comprises a first arm terminal, a second arm terminal, and a plurality of cells coupled between the first arm terminal and the second arm terminal. Each of the cells comprises a first cell terminal, a second cell terminal, switching elements, and a capacitor. The switching elements of each of the cells are adapted to selectively switch the respective cell between a first state, in which the capacitor is connected to the first and second cell terminals, and a second state, in which the capacitor is bypassed. The cells are connected in series between the first arm terminal and the second arm terminal such that the first cell terminal of a first cell of the plurality of cells is connected to the first arm terminal and the second cell terminal of a second cell of the plurality of cells is connected to the second arm terminal. The control unit is adapted to selectively operate in a mode in which the control unit provides control signals to the switching elements to repeatedly switch each of the cells between the first and second states in such a manner that the electric current in each of the arms is adjusted to match a respective predefined current reference value and that the capacitors are partially discharged until the electric voltage each capacitor provides is above a predefined minimum voltage reference value and below a predefined maximum voltage reference value.

Preferably, the converter is a modular multilevel converter. The converter comprises the plurality of arms and the control unit coupled to the plurality of arms. The control unit may be adapted to selectively operate in a mode or in multiple modes. Depending on the mode or the multiple modes, the control unit may provide control signals to an element or multiple elements of the converter, such as the switching elements.

Each of the arms comprises the first arm terminal, the second arm terminal, and the plurality of cells coupled between the first arm terminal and the second arm terminal. Each cell may be directly or indirectly coupled, e.g., via one or more other cells or via one or more other elements of the converter, to the first arm terminal. Similarly, each cell may be directly or indirectly coupled, e.g., via one or more other cells or via one or more other elements of the converter, to the second arm terminal.

Each of the cells comprises the first cell terminal, the second cell terminal, the switching elements, and the capacitor. Preferably, each of the switching elements can assume a conductive state and a non-conductive state and are adapted to be switched between the conductive and the non-conductive states. Each of the switching elements may comprise a transistor, particularly, an insulated gate bipolar transistor (IGBT). Preferably, each of the switching elements comprises an insulated-gate bipolar transistor and a diode. For example, each cell comprises two switching elements, which are connected to one another at a first connection point. The first connection point may be connected to the second cell terminal. A first switching element of the two switching elements may be connected to a first terminal of the capacitor and a second switching element of the two switching elements may be connected to a second terminal of the capacitor at a second connection point. The second connection point may be connected to the first cell terminal. Further preferred, each cell comprises four switching elements. A first switching element and a second switching element of the four switching elements may be connected to one another at a first connection point. The first connection point may be connected to the second cell terminal. The first switching element may be connected to a first terminal of the capacitor and the second switching element may be connected to a second terminal of the capacitor. Further, a third switching element and a fourth switching element of the four switching elements may be connected to one another at a second connection point. The second connection point may be connected to the first cell terminal. The third switching element may be connected to the first terminal of the capacitor and the fourth switching element may be connected to the second terminal of the capacitor. The first switching element and the third switching element may be connected to one another at a third connection point, which may be connected to the first terminal of the capacitor. The second switching element and the fourth switching element may be connected to one another at a fourth connection point, which is connected to the second terminal of the capacitor.

The switching elements of each of the cells are adapted to selectively switch the respective cell between the first state, in which the capacitor is connected to the first and second cell terminals, and the second state, in which the capacitor is bypassed. Preferably, the first state of a cell is defined such that the switching elements are in a state in which at least one of the switching elements is in a non-conductive state and arranged between the first and second cell terminals such that the first and second cell terminals are connected to each other via the at least one of the switching elements which is in the non-conductive state. Further, it is preferred that the first state of a cell is defined such that the switching elements are in a state in which at least one of the switching elements is in a conductive state and arranged between the capacitor and the first and second cell terminals such that the capacitor is connected to the first and second cell terminals via the at least one of the switching elements which is in the conductive state. Preferably, the second state of a cell is defined such that the switching elements are in a state in which at least one of the switching elements is in a conductive state and arranged between the first and second cell terminals such that the first and second cell terminals are connected to each other via the at least one of the switching elements which is in the conductive state. Further, it is preferred that the second state of a cell is defined such that the switching elements are in a state in which at least one of the switching elements is in a non-conductive state and arranged between the capacitor and the first and second cell terminals such that the capacitor is connected to the first and second cell terminals via the at least one of the switching elements which is in the non-conductive state.

The cells are connected in series between the first arm terminal and the second arm terminal such that the first cell terminal of the first cell of the plurality of cells is connected to the first arm terminal and the second cell terminal of the second cell of the plurality of cells is connected to the second arm terminal. The first cell terminal of the first cell of the plurality of cells may be directly or indirectly connected to the first arm terminal, for example via another element of the converter. Further, the second cell terminal of the second cell of the plurality of cells may be directly or indirectly connected to the second arm terminal, for example via another element of the converter.

The control unit is adapted to selectively operate in the mode in which the control unit provides control signals to the switching elements to repeatedly switch each of the cells between the first and second states in such a manner that the electric current in each of the arms is adjusted to match a respective predefined current reference value and that the capacitors are partially discharged until the electric voltage each capacitor provides is above the predefined minimum voltage reference value and below the predefined maximum voltage reference value. Preferably, the electric current in each of the arms matches the respective predefined current reference value during the time period in which the capacitors are partially discharged until the electric voltage each capacitor provides is above the predefined minimum voltage reference value and below the predefined maximum voltage reference value and the electric current in each of the arms matches the respective predefined current reference value until the end of this time period.

Since the electric current in each of the arms is adjusted to match a respective predefined current reference value, the predefined current reference value can be chosen such that the components of the converter, such as the switching elements and capacitors, are not damaged by large electric currents which could be generated if the capacitors would discharge uncontrollably, e.g., without defining a predefined current reference value. Therefore, the predefined current reference value in each arm provides a secure way of partially discharging the capacitors. The predefined current reference value for a particular arm may be the same as one or more of the predefined current reference values for the other arms. Alternatively, the predefined current reference value for a particular arm may be different from one or more of the predefined current reference values for the other arms. The converter may comprise a detection unit or multiple detection units, one or multiple for each arm, which is/are adapted to detect the electrical current in one, multiple, or all of the arms. The control unit may be adapted to provide the control signals to the switching elements, depending on the detected electrical current in one, multiple, or all of the arms, such that the electric current in each of the arms is adjusted to match the respective predefined current reference value.

The predefined minimum voltage reference value can be chosen such that the electrical voltage each of the capacitors provides is sufficient to provide enough power to operate the respective cell, particularly, the switching of the switching elements of the cell. The predefined minimum voltage reference value, therefore, ensures that enough power is provided by each capacitor to operate the cell of the respective capacitor. Therefore, the predefined minimum voltage reference value ensures a reliable way of partially discharging the capacitors, since enough power is available for operating the cells after the capacitors are partially discharged.

The predefined maximum voltage reference value can be chosen such that, after a first discharging step, the electrical voltage each of the capacitors provides is sufficiently low such that each of the capacitors is discharged at least to a value below the predefined maximum voltage reference value. The predefined maximum voltage reference value, therefore, ensures that bleeding resistors, which may be connected to the capacitors in a closed loop configuration in a further discharging step described further below, can be dimensioned smaller, e.g., in terms of their electrical resistances and geometrical dimensions, particularly, compared to situations in which the discharging of the capacitors is performed solely via bleeding resistors and without applying the present disclosure. Further, since, in case bleeding resistors are provided, bleeding resistors with lower electrical resistances can be employed due to the present disclosure. Therefore, the time constant of the capacitor and the bleeding resistors can be reduced, which decreases the time required to further partially discharge the capacitors during a further discharging step from the electric voltage value at the end of the step in which the capacitors are partially discharged as described above to the electric voltage value at the end of the further discharging step. Thereby, the total time required to discharge all capacitors can be significantly reduced. Therefore, the disclosure offers the possibility to provide a time efficient discharging method.

In summary, the converter provides a secure, reliable, and time efficient dissipation of the energy stored in the converter.

According to a preferred embodiment of the converter, each of the arms comprises an inductor, wherein the inductor is coupled between the first arm terminal of the respective arm and the plurality of cells of the respective arm and the first cell terminal of the first cell of the plurality of cells of the respective arm is indirectly connected to the first arm terminal via the inductor or the inductor is coupled between the second arm terminal of the respective arm and the plurality of cells of the respective arm and the second cell terminal of the second cell of the plurality of cells of the respective arm is indirectly connected to the second arm terminal via the inductor. Each inductor may reduce spikes in the electrical current in the respective arm, particularly, spikes in the electrical current resulting from switching the switching elements. Due to the inductors, further additional discrete current limiters may not be needed.

According to a preferred embodiment of the converter, the converter further comprises disconnecting switches, wherein each disconnecting switch of the disconnecting switches is adapted to assume a closed state, in which the disconnecting switch connects a respective first arm terminal or a respective second arm terminal to a terminal of an electrical grid, and is adapted to assume an open state, in which the disconnecting switch disconnects the respective first arm terminal or the respective second arm terminal from the terminal of the electrical grid, such that, in case each disconnecting switch of the disconnecting switches assumes the open state, no terminal of the electrical grid is connected to any of the first arm terminals or second arm terminals. The disconnecting switches ensure that the converter can be disconnected from the electrical grid. For example, a disconnecting switch may be provided for each AC (alternating current) terminal and for each DC (direct current) terminal of the converter so that each of the terminals can be disconnected from the electrical grid and, therefore, the converter can be disconnected from the electrical grid.

According to a preferred embodiment of the converter, the arms successively reach a first state in which each capacitor of the respective arm is partially discharged such that the electric voltage each capacitor of the respective arm provides is above the predefined minimum voltage reference value and below the predefined maximum voltage reference value. The state of an arm in which each capacitor of the respective arm is partially discharged such that the electric voltage each capacitor of the respective arm provides is above the predefined minimum voltage reference value and below the predefined maximum voltage reference value can be regarded as a first state of the arm. In this preferred embodiment of the converter, the arms successively reach a first state, i.e., the arms reach the first state one after the other, and, particularly, not simultaneously. If the arms successively reach the first state, each arm can faster reach the first state for a given predefined current reference value in each arm.

According to a preferred embodiment of the converter, the arms successively reach a second state in which each capacitor of the respective arm has started to partially discharge, wherein the arms successively reach both the first state and the second state. For example, a first arm reaches the second state in which each capacitor of the respective arm has started to partially discharge, afterwards, the first arm reaches the first state in which each capacitor of the respective arm is partially discharged such that the electric voltage each capacitor of the respective arm provides is above the predefined minimum voltage reference value and below the predefined maximum voltage reference value, afterwards, a second arm reaches the second state, afterwards, the second arm reaches the first state, afterwards, a third arm reaches the second state, afterwards, the third arm reaches the first state, and, similarly, further arms may reach the first and second states. Particularly, the present disclosure provides the possibility of specifically selecting different time periods for discharging all capacitors from the end of a disconnecting step until maintenance work can be performed safely. Thereby, different time requirements for discharging all capacitors from the end of the disconnecting step until maintenance work can be performed safely can be achieved.

According to a preferred embodiment of the converter, the cells successively reach a third state in which the capacitor of the respective cell is partially discharged such that the electric voltage the capacitor provides is above the predefined minimum voltage reference value and below the predefined maximum voltage reference value. In this preferred embodiment of the converter, the cells are partially discharged one after the other.

According to a preferred embodiment of the converter, the converter further comprises bleeding resistors and resistor switches, wherein for each cell at least one of the resistor switches is adapted to assume a closed state, in which the at least one resistor switch connects the capacitor of the cell to at least one bleeding resistor in a closed loop configuration, and is adapted to assume an open state, in which the at least one resistor switch disconnects the capacitor of the cell from the at least one bleeding resistor. The converter may comprise, for example, two bleeding resistors and two resistor switches for each cell. For each cell, a first resistor switch may be connected to the first terminal of the capacitor and to a first bleeding resistor, a second resistor switch may be connected to the second terminal of the capacitor and to a second bleeding resistor, and the first bleeding resistor and the second bleeding resistor may be connected to each other at a connection point. Each of the resistor switches may be adapted to assume a closed state. If both resistor switches of a particular cell are in the closed state, the resistor switches of the cell may connect the capacitor of the cell to the two bleeding resistors in a closed loop configuration. Further, each of the resistor switches may be adapted to assume an open state. If one of the resistor switches of a particular cell is in the open state, this resistor switch may disconnect the capacitor from the bleeding resistors, particularly in such a way that no closed loop configuration is formed between the capacitor of the cell and the two bleeding resistors. As already discussed, due to the present disclosure, the bleeding resistors can be dimensioned smaller, e.g., in terms of their electrical resistances and geometrical dimensions, particularly, compared to situations in which the discharging of the capacitors is performed solely via bleeding resistors and without performing the partial discharging of the capacitors as described above. Further, since bleeding resistors with lower electrical resistances can be employed due to the present disclosure, the time constant of the capacitor and the bleeding resistors, i.e., the RC time constant of the capacitor and the bleeding resistors, can be reduced, which decreases the time required to further partially discharge the capacitors during a further discharging step from the electric voltage value at the end of the step in which the capacitors are partially discharged to the electric voltage value at the end of the further discharging step. Thereby, the total time required to discharge all capacitors from the end of the disconnecting step until maintenance work can be performed safely can be significantly reduced.

According to a preferred embodiment of the converter, the control unit is adapted to provide control signals to the resistor switches, such that each resistor switch of the resistor switches assumes the closed state after each of the arms has reached the first state. As described above, the state of an arm in which each capacitor of the respective arm is partially discharged such that the electric voltage each capacitor of the respective arm provides is above the predefined minimum voltage reference value and below the predefined maximum voltage reference value can be regarded as a first state of the arm. The situation in which each of the arms has reached the first state can also be regarded as the end of a first discharging step, which will be described in more detail further below. If the control signals are provided to the resistor switches, such that each resistor switch of the resistor switches assumes the closed state after each of the arms has reached the first state ensures that a second discharging step is performed after the end of the first discharging step.

According to a preferred embodiment of the converter, the converter further comprises at least one grounding switch, wherein each grounding switch of the at least one grounding switch is adapted to assume a closed state, in which the grounding switch connects the capacitors of at least one of the arms to ground or enables the capacitors of the at least one arm to be connected to ground, and is adapted to assume an open state, in which the grounding switch disconnects the capacitors of the at least one arm from ground, such that, in case each grounding switch of the grounding switches assumes the closed state, each of the capacitors of the arms are connected to ground or are enabled to be connected to ground. The at least one grounding switch ensures that the capacitors can be selectively connected to ground.

According to a preferred embodiment of the converter, the control unit is adapted to provide control signals to the at least one grounding switch, such that each grounding switch of the at least one grounding switch assumes the closed state after each resistor switch of the resistor switches has assumed the closed state. The situation in which each resistor switch has assumed the closed state can also be regarded as the end of the second discharging step, which will be described in more detail further below. If the control signals are provided to the at least one grounding switch, such that each grounding switch assumes the closed state after each resistor switch of the resistor switches has assumed the closed state ensures that a third discharging step is performed after the end of the first discharging step.

According to a preferred embodiment of the converter, the plurality of arms are connected to each other such that each arm is connected to at least one of the other arms such that the arm forms a closed loop configuration together with the at least one of the other arms. For example, three arms may form a single delta configuration in which the three arms form a closed loop configuration, or, alternatively, six arms may form a double star type configuration in which a group of four arms may form a closed loop configuration.

According to a second aspect of the present disclosure, method is adapted for controlling a converter according to the first aspect of the present disclosure. The method comprises a first discharging step, in which each of the cells is repeatedly switched between the first and second states in such a manner that the electric current in each of the arms is adjusted to match the respective predefined current reference value and that the capacitors are partially discharged until the electrical voltage each capacitor provides is above the predefined minimum voltage reference value and below the predefined maximum voltage reference value. For example, for the situation in which the converter needs maintenance, the method comprises a disconnecting step, in which each of the disconnecting switches assumes the open state, such that no terminal of the electrical grid is connected to any of the first arm terminals or second arm terminals. Preferably, the disconnecting step is performed prior to the first discharging step. To perform the disconnecting step, the control unit may provide control signals to the disconnecting switches to switch each of the disconnecting switches to the open state. After the disconnecting step, the electrical energy stored in the converter, particularly in the capacitors of the converter, needs to be dissipated such that the maintenance work can be performed safely. Preferably after the disconnecting step is performed, the first discharging step is performed. To perform the first discharging step, the control unit may provide control signals to the switching elements to repeatedly switch each of the cells between the first and second states. Since the electric current in each of the arms is adjusted to match a respective predefined current reference value, the predefined current reference value can be chosen such that the components of the converter, such as the switching elements and capacitors, are not damaged by large electric currents which could be generated if the capacitors would discharge uncontrollably, e.g., without defining a predefined current reference value. Since the capacitors are partially discharged until the electrical voltage each capacitor provides is above a predefined minimum voltage reference value and below a predefined maximum voltage reference value, all capacitors are partially discharged after the first discharging step such that the electrical voltage each of the capacitors provides is above the predefined minimum voltage reference value and below the predefined maximum voltage reference value. The predefined minimum voltage reference value can be chosen such that, after the first discharging step, the electrical voltage each of the capacitors provides is sufficient to provide enough power to operate the respective cell, particularly, the switching of the switching elements of the cell. The predefined minimum voltage reference value, therefore, ensures that enough power is provided by each capacitor to operate the cell of the respective capacitor. The predefined maximum voltage reference value can be chosen such that, after the first discharging step, the electrical voltage each of the capacitors provides is sufficiently low such that each of the capacitors is discharged at least to a value below the predefined maximum voltage reference value. The predefined maximum voltage reference value, therefore, ensures that the bleeding resistors, which may be connected to the capacitors in a closed loop configuration in a second discharging step described further below, can be dimensioned smaller, e.g., in terms of their electrical resistances and geometrical dimensions, particularly, compared to situations in which the discharging of the capacitors is performed solely via bleeding resistors and without performing the inventive first discharging step.

According to a preferred embodiment of the method, the method further comprises a second discharging step, in which each resistor switch of the resistor switches assumes the closed state after each of the arms has reached the first state. Preferably, the second discharging step is performed after the first discharging step is performed. To perform the second discharging step, the control unit may provide control signals to the resistor switches, such that each resistor switch assumes the closed state. Since each resistor switch assumes the closed state, the resistor switches of each cell connect the capacitor of that cell to the bleeding resistors of that cell in a closed loop configuration, and, thereby discharge the capacitors to a value which is below the predefined minimum voltage reference value and is equivalent to a value which is low enough such that a third discharging step, as described further below, can be performed in a safe manner. By combining the first discharging step and the second discharging step it is possible that the bleeding resistors can be dimensioned smaller, e.g., in terms of their electrical resistances and geometrical dimensions, particularly, compared to situations in which the discharging of the capacitors is performed solely via bleeding resistors and without performing the inventive first discharging step. Further, since bleeding resistors with lower electrical resistances can be employed due to the present disclosure, the time constant of the capacitor and the bleeding resistors can be reduced, which decreases the time required to further partially discharge the capacitors during the second discharging step from the electric voltage value at the end of the first discharging step to the electric voltage value at the end of the second discharging step. Thereby, the total time required to discharge all capacitors from the end of the disconnecting step until maintenance work can be performed safely can be reduced significantly.

According to a preferred embodiment of the method, a third discharging step, in which each grounding switch assumes the closed state after each resistor switch has assumed the closed state. Preferably, the third discharging step is performed after the second discharging step is performed. Particularly, each resistor switch is still in the closed state during the third discharging step. Thereby, the first and second terminals of each capacitor are connected to ground, such that after the third discharging step maintenance work can be performed safely.

The features, technical effects and/or advantages described in connection with the first aspect of the disclosure also apply to the second aspect of the disclosure at least in an analogous manner, so that no corresponding repetition is made here. Even though the method steps are described in a certain order, the present disclosure is not restricted to this order. Rather, the individual method steps can be carried out in any meaningful sequence.

Further features, advantages and application possibilities of the present disclosure may be derived from the following description of exemplary embodiments and/or the figures. Thereby, all described and/or visually depicted features for themselves and/or in any combination may form an advantageous subject matter and/or features of the present disclosure independent of their combination in the individual claims or their dependencies. Furthermore, in the figures, same reference signs may indicate same or similar objects.

FIG. 1 schematically shows a first embodiment of a converter 1. The first embodiment of the converter 1 may be regarded as a double star type converter. The converter 1 comprises six arms 3. Each of the arms 3 comprises a plurality of cells 5 and an inductor 7. Further, each arm 3 comprises a first arm terminal 9 and a second arm terminal 11. In each arm 3, the plurality of cells 5 are coupled between the first arm terminal 9 and the second arm terminal 11 and the inductor 7 is coupled between the first arm terminal 9 and the plurality of cells 5, wherein the inductor 7 is directly coupled to the first arm terminal 9 and one of the cells 5. Another one of the cells 5 is directly coupled to the second arm terminal 11 and a further one of the cells 5. Each of the arms 3 is connected with its first arm terminal 9 to one of three AC (alternating current) terminals 13 of the converter 1 and each of the arms 3 is connected with its second arm terminal 11 to one of two DC (direct current) terminals 15 of the converter 1. The arms 3 form three arm pairs, wherein each of the arm pairs comprises a first arm 3 and a second arm 3, wherein the first arm 3 and the second arm 3 are connected to the same AC terminal 13 and to different DC terminals 15. Further, each arm pair is connected to a different AC terminal 13.

Figure 2:
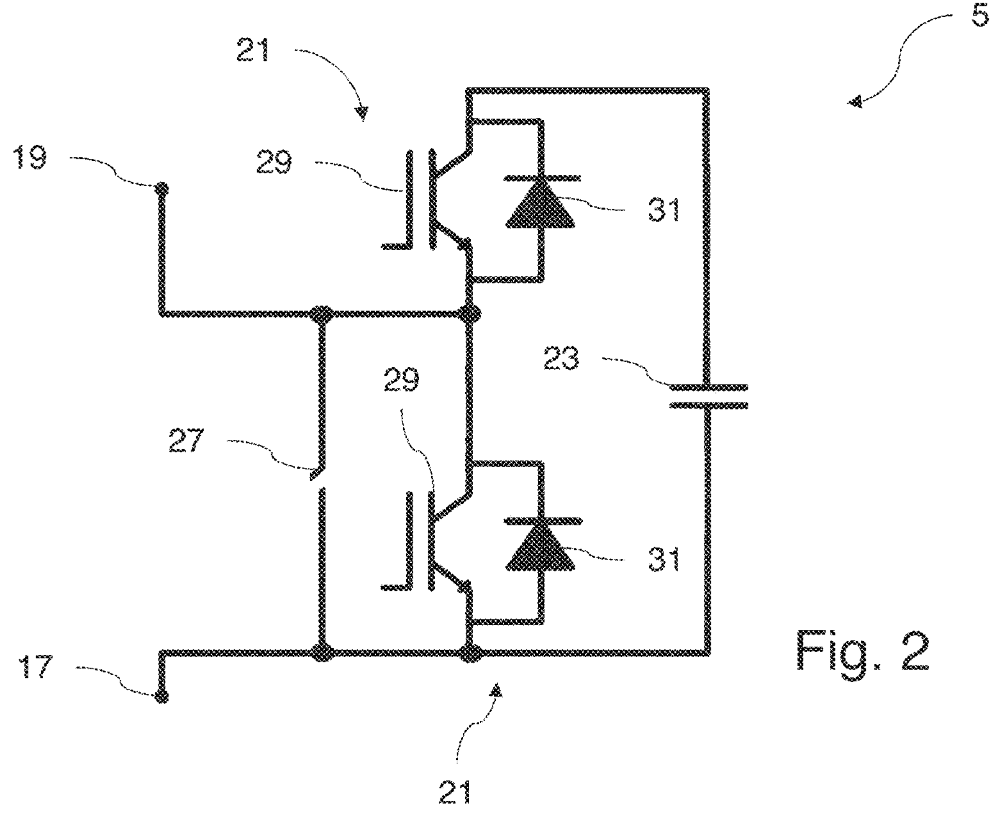
FIG. 2 schematically shows a first embodiment of a cell of an arm of the converter shown in FIG. 1.

FIG. 2 schematically shows a first embodiment of the cell 5 of an arm 3 of the converter 1 shown in FIG. 1. The first embodiment of the cell 5 may be regarded as a half-bridge type cell. In case the first embodiment of the converter 1 shown in FIG. 1 comprises the first embodiment of the cell 5, the converter 1 may be regarded as a double star half-bridge type converter. The cell 5 comprises a first cell terminal 17, a second cell terminal 19, two switching elements 21, a capacitor 23, and a bypass unit 27. Each of the switching elements 21 comprises an insulated-gate bipolar transistor (IGBT) 29 and a diode 31. Each of the cells 5 shown in FIG. 1 can be configured as the cell 5 shown in FIG. 2 is configured. The cells 5 are connected in series between the first arm terminal 9 and the second arm terminal 11 such that the first cell terminal 17 of a first cell 5 of the plurality of cells 5 is connected to the first arm terminal 9 and the second cell terminal 19 of a second cell 5 of the plurality of cells 5 is connected to the second arm terminal 11. In the embodiment shown in FIG. 1, the inductor 7 of each arm 3 is directly connected to the first arm terminal 9 of the arm 3 and the inductor 7 of the arm 3 is directly connected to the first cell terminal 17 of the first cell 5. In this configuration, the first cell terminal 17 of the first cell 5 can be regarded as being indirectly connected to the first arm terminal 9 via the inductor 7. The second cell terminal 19 of the first cell 5 is directly connected to a first cell terminal 17 of another cell 5, and the other cell 5 is connected with its second cell terminal 19 to a first cell terminal 17 of yet another cell 5. The cells 5 of each arm 3 are directly connected to each other in series in this manner, wherein at a first end of this series connection the first cell 5 is provided and at a second end of this series connection the second cell 5 is provided, wherein in between the first cell 5 and the second cell 5 a number of cells 5 are connected in series in the manner as just described. The second last cell 5 from the second end of this series connection is directly connected with its second cell terminal 19 to the first cell terminal 17 of the second cell 5 and the second cell 5 is directly connected with its second cell terminal 19 to the second arm terminal 11.

The two switching elements 21 of the cell 5 are connected to one another at a first connection point. The first connection point is connected to the second cell terminal 19. A first switching element 21 of the two switching elements 21 is connected to a first terminal of the capacitor 23 and a second switching element 21 of the two switching elements 21 is connected to a second terminal of the capacitor 23 at a second connection point. The second connection point is connected to the first cell terminal 17. The bypass unit 27 is connected to the first and second cell terminals 17, 19.

The switching elements 21 are adapted to connect the capacitor 23 to the first cell terminal 17 and to the second cell terminal 19 and to bypass the capacitor 23. The switching elements 21 are therefore adapted to selectively switch the respective cell 5 between a first state, in which the capacitor 23 is connected to the first and second cell terminals 17, 19, and a second state, in which the capacitor 23 is bypassed. Particularly in the first state, a voltage provided by the capacitance can be provided as a cell output voltage by the first terminal 17 and the second terminal 19. The bypass unit 27 is adapted to bypass the two switching elements 21, and the capacitor 23 in a short circuit state and to not bypass the two switching elements 21, and the capacitor 23 in an open circuit state.

Figure 3:
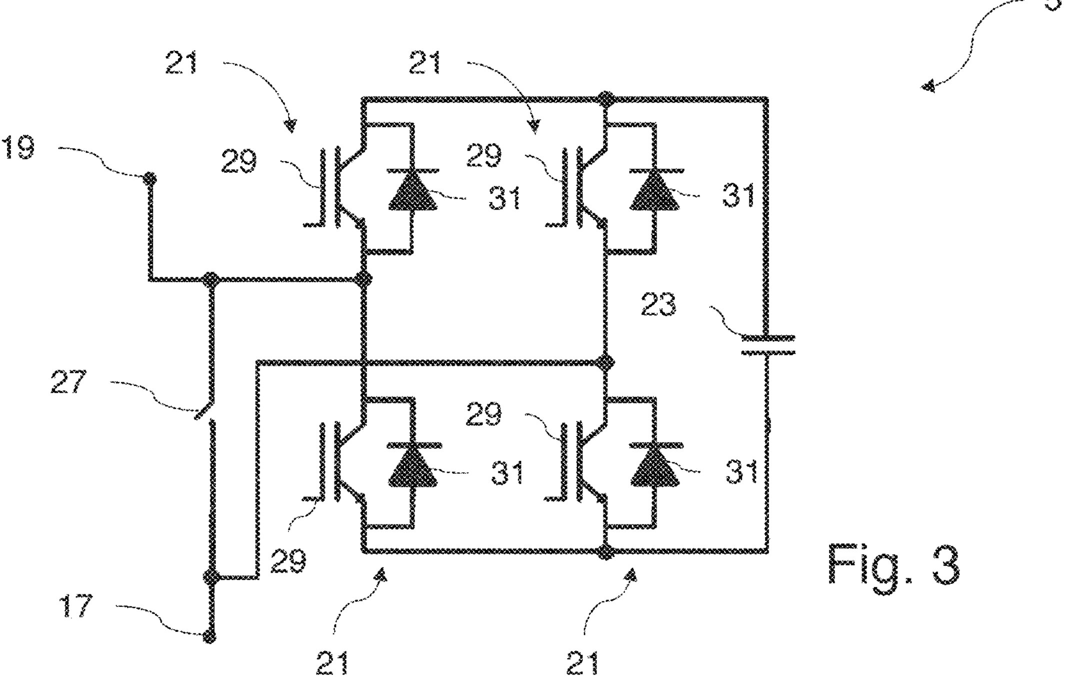
FIG. 3 schematically shows a second embodiment of a cell of an arm of the converter shown in FIG. 1.

FIG. 3 schematically shows a second embodiment of a cell 5 of an arm 3 of the converter 1 shown in FIG. 1. The second embodiment of the cell 5 may be regarded as a full-bridge type cell. In case the first embodiment of the converter 1 shown in FIG. 1 comprises the second embodiment of the cell 5, the converter 1 may be regarded as a double star full-bridge type converter. The cell 5 comprises a first cell terminal 17, a second cell terminal 19, four switching elements 21, a capacitor 23, and a bypass unit 27. Each of the switching elements 21 comprises an insulated-gate bipolar transistor (IGBT) 29 and a diode 31. Each of the cells 5 shown in FIG. 1 can be configured as the cell 5 shown in FIG. 3 is configured. The cells 5 are connected in series between the first arm terminal 9 and the second arm terminal 11 such that the first cell terminal 17 of a first cell 5 of the plurality of cells 5 is connected to the first arm terminal 9 and the second cell terminal 19 of a second cell 5 of the plurality of cells 5 is connected to the second arm terminal 11. In the embodiment shown in FIG. 1, the inductor 7 of each arm 3 is directly connected to the first arm terminal 9 of the arm 3 and the inductor 7 of the arm 3 is directly connected to the first cell terminal 17 of the first cell 5. In this configuration, the first cell terminal 17 of the first cell 5 can be regarded as being indirectly connected to the first arm terminal 9 via the inductor 7. The second cell terminal 19 of the first cell 5 is directly connected to a first cell terminal 17 of another cell 5, and the other cell 5 is connected with its second cell terminal 19 to a first cell terminal 17 of yet another cell 5. The cells 5 of each arm 3 are directly connected to each other in series in this manner, wherein at a first end of this series connection the first cell 5 is provided and at a second end of this series connection the second cell 5 is provided, wherein in between the first cell 5 and the second cell 5 a number of cells 5 are connected in series in the manner as just described. The second last cell 5 from the second end of this series connection is directly connected with its second cell terminal 19 to the first cell terminal 17 of the second cell 5 and the second cell 5 is directly connected with its second cell terminal 19 to the second arm terminal 11.

A first switching element 21 and a second switching element 21 are connected to one another at a first connection point. The first connection point is connected to the second cell terminal 19. The first switching element 21 is connected to a first terminal of the capacitor 23 and the second switching element 21 is connected to a second terminal of the capacitor 23. A third switching element 21 and a fourth switching element 21 are connected to one another at a second connection point. The second connection point is connected to the first cell terminal 17. The third switching element 21 is connected to the first terminal of the capacitor 23 and the fourth switching element 21 is connected to the second terminal of the capacitor 23. The first switching element 21 and the third switching element 21 are connected to one another at a third connection point, which is connected to the first terminal of the capacitor 23. The second switching element 21 and the fourth switching element 21 are connected to one another at a fourth connection point, which is connected to the second terminal of the capacitor 23. The bypass unit 27 is connected to the first and second cell terminals 17, 19.

The switching elements 21 are adapted to connect the capacitor 23 to the first cell terminal 17 and to the second cell terminal 19 and to bypass the capacitor 23. The switching elements 21 are therefore adapted to selectively switch the respective cell 5 between a first state, in which the capacitor 23 is connected to the first and second cell terminals 17, 19, and a second state, in which the capacitor 23 is bypassed. Particularly in the first state, a voltage provided by the capacitance can be provided as a cell output voltage by the first terminal 17 and the second terminal 19. Particularly, the first state can comprise a first sub-state and a second sub-state, wherein, in both, the first sub-state and second sub-state, the capacitor 23 is connected to the first and second cell terminals 17, 19. However, in the first sub-state the capacitor 23 is connected to the first cell terminal 17 and to the second cell terminal 19 such that the voltage provided by the capacitor 23 Vc is provided as the cell output voltage Vo with Vo=Vc and in the second sub-state the capacitor 23 is connected to the first cell terminal 17 and to the second cell terminal 19 such that the voltage provided by the capacitor 23 Vc is provided as the cell output voltage Vo with Vo=−Vc. Hence, the second embodiment of the cell 5 can provide cell output voltages with alternating polarity. The bypass unit 27 is adapted to bypass the four switching elements 21, and the capacitor 23 in a short circuit state and to not bypass the two switching elements 21, and the capacitor 23 in an open circuit state.

Figure 4:
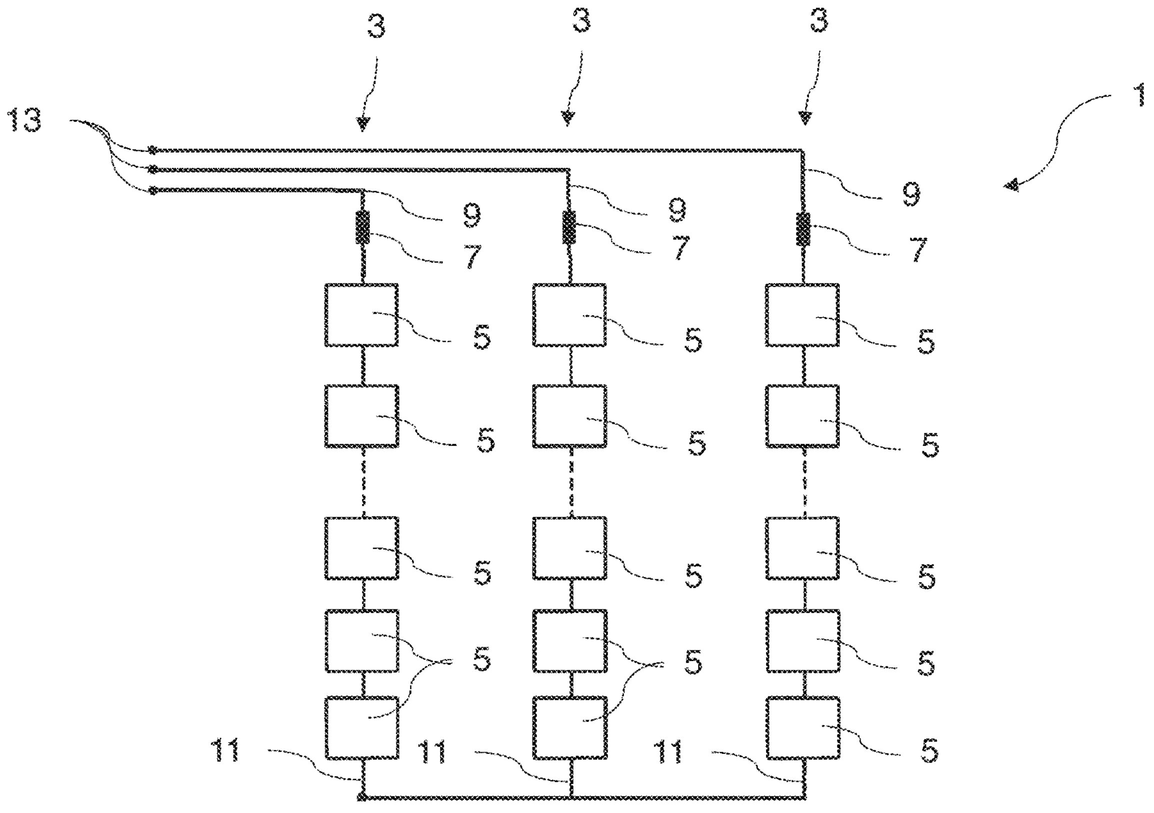
FIG. 4 schematically shows a second embodiment of the converter.

FIG. 4 schematically shows a second embodiment of the converter 1. The second embodiment of the converter 1 may be regarded as a single star type converter. The converter 1 comprises three arms 3. Each of the arms 3 comprises a plurality of cells 5 and an inductor 7. Further, each arm 3 comprises a first arm terminal 9 and a second arm terminal 11. In each arm 3, the plurality of cells 5 are coupled between the first arm terminal 9 and the second arm terminal 11 and the inductor 7 is coupled between the first arm terminal 9 and the plurality of cells 5, wherein the inductor 7 is directly coupled to the first arm terminal 9 and one of the cells 5 and another one of the cells 5 is directly coupled to the second arm terminal 11 and a further one of the cells 5. Each of the arms 3 is connected with its first arm terminal 9 to one of three AC (alternating current) terminals 13 of the converter 1 and each of the arms 3 is connected with its second arm terminal 11 to the second arm terminals 11 of the other arms 3. Each cell 5 of each arm 3 of the second embodiment of the converter 1 may be configured according to the first embodiment of the cell 5 shown in FIG. 2 or, alternatively, each cell 5 of each arm 3 of the second embodiment of the converter 1 may be configured according to the second embodiment of the cell 5 shown in FIG. 3. In case each cell 5 of each arm 3 of the second embodiment of the converter 1 is configured according to the first embodiment of the cell 5 shown in FIG. 2, the converter 1 may be regarded as a single star half-bridge type converter. In case each cell 5 of each arm 3 of the second embodiment of the converter 1 is configured according to the second embodiment of the cell 5 shown in FIG. 3, the converter 1 may be regarded as a single star full-bridge type converter.

Figure 5:
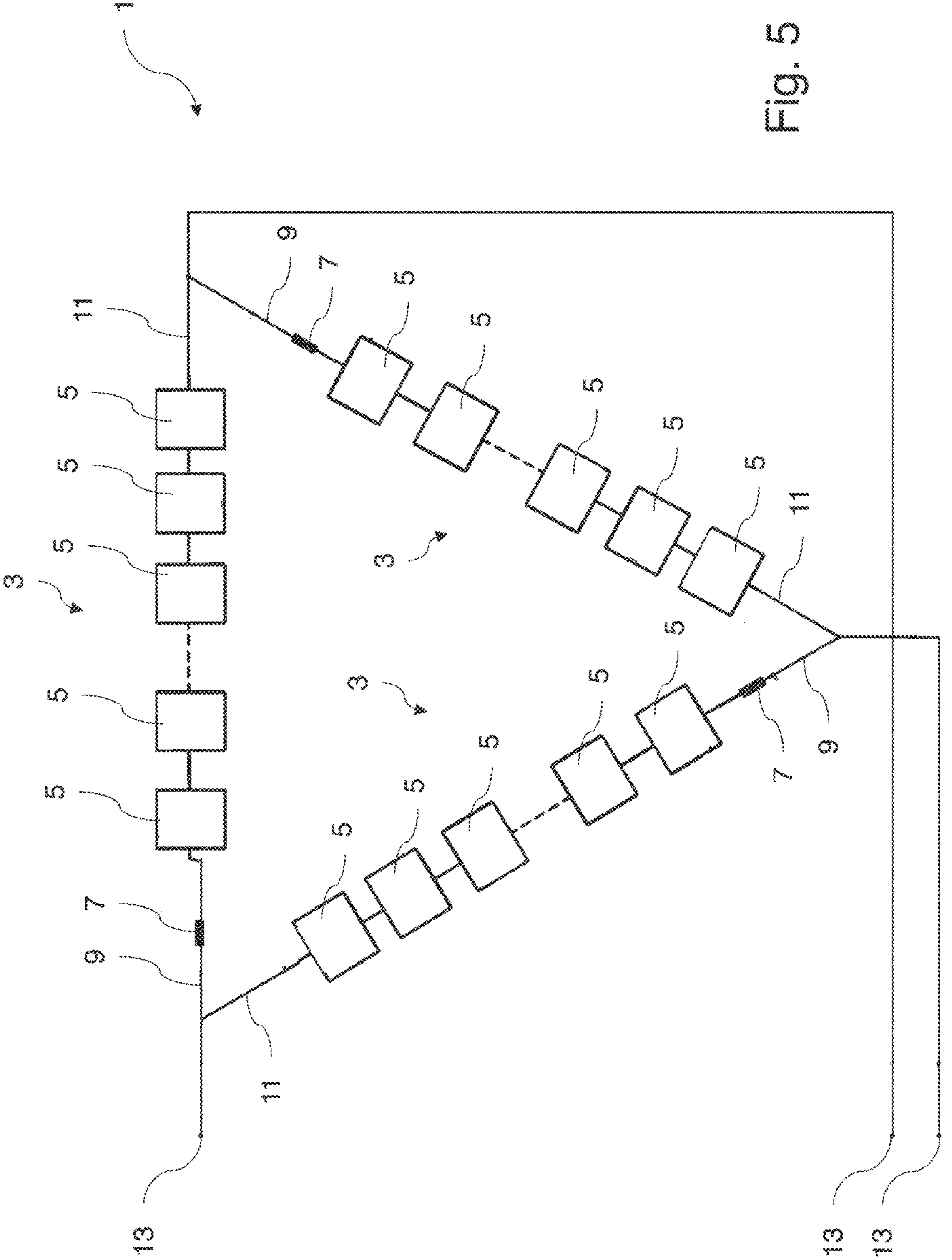
FIG. 5 schematically shows a third embodiment of the converter.

FIG. 5 schematically shows a third embodiment of the converter 1. The third embodiment of the converter 1 may be regarded as a single delta type converter. The converter 1 comprises three arms 3. Each of the arms 3 comprises a plurality of cells 5 and an inductor 7. Further, each arm 3 comprises a first arm terminal 9 and a second arm terminal 11. In each arm 3, the plurality of cells 5 are coupled between the first arm terminal 9 and the second arm terminal 11 and the inductor 7 is coupled between the first arm terminal 9 and the plurality of cells 5, wherein the inductor 7 is directly coupled to the first arm terminal 9 and one of the cells 5 and another one of the cells 5 is directly coupled to the second arm terminal 11 and a further one of the cells 5. Each of the arms 3 is connected with its first arm terminal 9 to one of three AC (alternating current) terminals 13 of the converter 1 and to a second arm terminal 11 of one of the other two arms 3. Each cell 5 of each arm 3 of the third embodiment of the converter 1 may be configured according to the first embodiment of the cell 5 shown in FIG. 2 or, alternatively, each cell 5 of each arm 3 of the third embodiment of the converter 1 may be configured according to the second embodiment of the cell 5 shown in FIG. 3. In case each cell 5 of each arm 3 of the second embodiment of the converter 1 is configured according to the first embodiment of the cell 5 shown in FIG. 2, the converter 1 may be regarded as a single delta half-bridge type converter. In case each cell 5 of each arm 3 of the second embodiment of the converter 1 is configured according to the second embodiment of the cell 5 shown in FIG. 3, the converter 1 may be regarded as a single delta full-bridge type converter.

Figure 6:
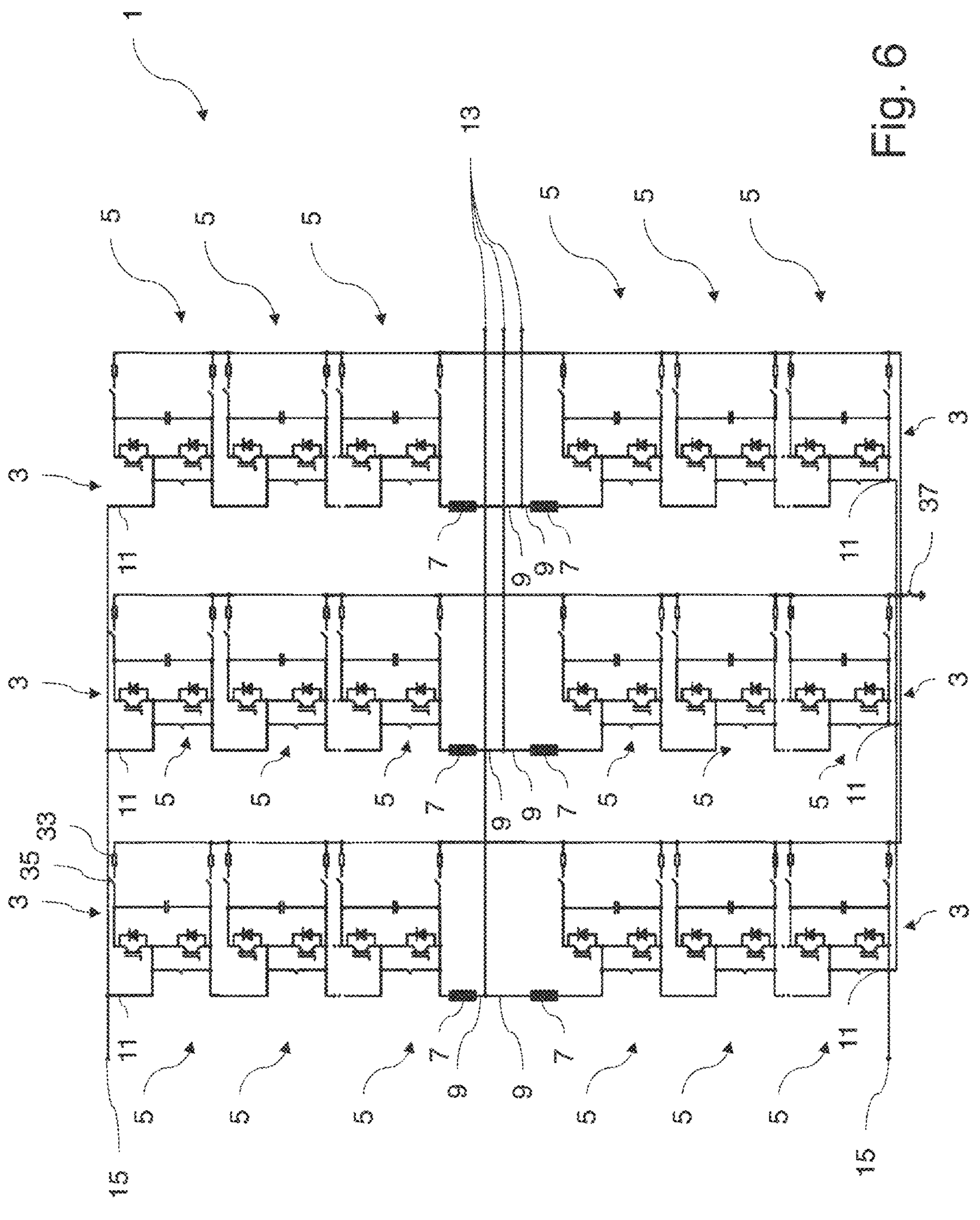
FIG. 6 schematically shows the first embodiment of the converter shown in FIG. 1.

Further, FIG. 6 schematically shows the first embodiment of the converter 1 shown in FIG. 1. Each cell 5 of the converter 1 shown in FIG. 6 is a cell 5 configured as a first embodiment of the cell 5 as shown in FIG. 2. As is shown in FIG. 6, the converter 1 further comprises bleeding resistors 33 and resistor switches 35. The converter 1 disclosed in FIG. 6 comprises two bleeding resistors 33 and two resistor switches 35 for each cell 5. For each cell 5, a first resistor switch 35 is connected to the first terminal of the capacitor 23 and to a first bleeding resistor 33, a second resistor switch 35 is connected to the second terminal of the capacitor 23 and to a second bleeding resistor 33, and the first bleeding resistor 33 and the second bleeding resistor 33 are connected to each other at a connection point. Each of the resistor switches 35 is adapted to assume a closed state. If both resistor switches 35 of a particular cell 5 are in the closed state, the resistor switches 35 of the cell 5 connect the capacitor 23 of the cell 5 to the two bleeding resistors 33 in a closed loop configuration. Further, each of the resistor switches 35 is adapted to assume an open state. If one of the resistor switches 35 of a particular cell 5 is in the open state, this resistor switch 35 disconnects the capacitor 23 from the bleeding resistors 33, particular in such a way that no closed loop configuration is formed between the capacitor 23 of the cell 5 and the two bleeding resistors 33.

Further, the converter 1 shown in FIG. 6 comprises a grounding switch 37. The grounding switch 37 is connected to each of the connection points between the two bleeding resistors 33 of each cell 5 and to ground. The grounding switch 37 is adapted to assume a closed state, in which the grounding switch 37 connects each of the connection points between the two bleeding resistors 33 of each cell 5 to ground. Further, the grounding switch 37 is adapted to assume an open state, in which the grounding switch 37 disconnects each of the connection points between the two bleeding resistors 33 of each cell 5 from ground. In case a resistor switch 35 of a particular cell 5 assumes the closed state and the grounding switch 37 assumes the closed state, the grounding switch 37 connects the capacitor 23 of the particular cell 5 to ground. Similarly, in case the other resistor switch 35 of the particular cell 5 assumes the closed state and the grounding switch 37 assumes the closed state, the grounding switch 37 also connects the capacitor 23 of the particular cell 5 to ground. Similarly, in case both resistor switches 35 of the particular cell 5 assume the closed state and the grounding switch 37 assumes the closed state, the grounding switch 37 also connects the capacitor 23 of the particular cell 5 to ground. In a similar way, the grounding switch 37 can connect each of the capacitors 23 to ground or enables each of the capacitors 23 to be connected to ground by one or multiple or all of the resistor switches 35 assuming the closed state. Therefore, the grounding switch 37 is adapted to assume a closed state, in which the grounding switch 37 connects the capacitors 23 to ground or enables the capacitors 23 to be connected to ground, and is adapted to assume an open state, in which the grounding switch 37 disconnects the capacitors 23 from ground, such that, in case the grounding switch 37 assumes the closed state, each of the capacitors 23 are connected to ground or are enabled to be connected to ground.

The second embodiment of the converter 1 shown in FIG. 4 and the third embodiment of the converter 1 shown in FIG. 5 each comprise bleeding resistors 33, resistor switches 35, and a grounding switch 37 in a similar manner as described in relation to the first embodiment of the converter 1 disclosed in FIG. 6. The features, technical effects and/or advantages described in connection with the bleeding resistors 33, resistor switches 35, and a grounding switch 37 of the first embodiment of the converter 1 disclosed in FIG. 6 also apply to the second embodiment of the converter 1 shown in FIG. 4 and the third embodiment of the converter 1 shown in FIG. 5, so that no corresponding repetition is made here.

Each of the converters 1 further comprises disconnecting switches. Each of the disconnecting switches is adapted to assume a closed state, in which the disconnecting switch connects a respective first arm terminal 9 or a respective second arm terminal 11 to a terminal of an electrical grid, and is adapted to assume an open state, in which the disconnecting switch disconnects the respective first arm terminal 9 or the respective second arm terminal 11 from the terminal of the electrical grid, such that, in case each disconnecting switch of the disconnecting switches assumes the open state, no terminal of the electrical grid is connected to any of the first arm terminals 9 or second arm terminals 11. For each of the converters 1, a disconnecting switch is provided for each AC (alternating current) terminal 13 and for each DC (direct current) terminal 15 so that each of the terminals 13, 15 can be disconnected from the electrical grid and, therefore, the converter 1 can be disconnected from the electrical grid.

Each of the embodiments of the converter 1 also comprises a control unit. The control unit (controller) is coupled to the plurality of arms 3, particularly such that the control unit can provide control signals to the switching elements 21, the resistor switches 35, the grounding switch 37, and the disconnecting switches. The control unit is adapted to selectively operate in a mode in which the control unit provides control signals to the switching elements 21 to repeatedly switch each of the cells 5 between the first and second states, i.e., from the first state to the second state and from the second state to the first state. Similarly, the control unit is adapted to selectively operate in a mode in which the control unit provides control signals to the resistor switches 35 to switch each of the resistor switches 35 between the closed state and the open state, i.e., from the closed state to the open state and from the open state to the closed state. Further, the control unit is adapted to selectively operate in a mode in which the control unit provides control signals to the grounding switch 37 to switch the grounding switch 37 between the closed state and the open state, i.e., from the closed state to the open state and from the open state to the closed state. Further, the control unit is adapted to selectively operate in a mode in which the control unit provides control signals to the disconnecting switches to switch each of the disconnecting switches between the closed state and the open state, i.e., from the closed state to the open state and from the open state to the closed state. Preferably, in each of the embodiments of the converter 1, the converter 1 is a modular multilevel converter and configured as described above.

In addition to the converter 1, the present disclosure also relates to a method for controlling the converter 1. The inventive converter 1 is therefore adapted to perform each of the method steps as described below. The features, technical effects and/or advantages described in connection with the converter 1 also apply to the method, and vice versa, at least in an analogous manner, so that no corresponding repetition is made here. Even though the method steps are described in a certain order, the present disclosure is not restricted to this order. Rather, the individual method steps can be carried out in any meaningful sequence.

For example, for the situation in which the converter 1 needs maintenance, the method comprises a disconnecting step, in which each of the disconnecting switches assumes the open state, such that no terminal of the electrical grid is connected to any of the first arm terminals 9 or second arm terminals 11. To perform the disconnecting step, the control unit provides control signals to the disconnecting switches to switch each of the disconnecting switches to the open state.

After the disconnecting step, the electrical energy stored in the converter 1, particularly in the capacitors 23 of the converter 1, needs to be dissipated such that the maintenance work can be performed safely.

After the disconnecting step is performed, a first discharging step is performed. In the first discharging step each of the cells 5 is repeatedly switched between the first and second states in such a manner that the electric current in each of the arms 3 is adjusted to match a respective predefined current reference value and that the capacitors 23 are partially discharged until the electrical voltage each capacitor 23 provides is above a predefined minimum voltage reference value and below a predefined maximum voltage reference value. To perform the first discharging step, the control unit provides control signals to the switching elements 21 to repeatedly switch each of the cells 5 between the first and second states. Since the electric current in each of the arms 3 is adjusted to match a respective predefined current reference value, the predefined current reference value can be chosen such that the components of the converter 1, such as the switching elements 21 and capacitors 23, are not damaged by large electric currents which could be generated if the capacitors 23 would discharge uncontrollably, e.g., without defining a predefined current reference value. Since the capacitors 23 are partially discharged until the electrical voltage each capacitor 23 provides is above a predefined minimum voltage reference value and below a predefined maximum voltage reference value, all capacitors 23 are partially discharged after the first discharging step such that the electrical voltage each of the capacitors 23 provides is above the predefined minimum voltage reference value and below the predefined maximum voltage reference value. The predefined minimum voltage reference value can be chosen such that, after the first discharging step, the electrical voltage each of the capacitors 23 provides is sufficient to provide enough power to operate the respective cell 5, particularly, the switching of the switching elements 21 of the cell 5. The predefined minimum voltage reference value, therefore, ensures that enough power is provided by each capacitor 23 to operate the cell 5 of the respective capacitor 23. The predefined maximum voltage reference value can be chosen such that, after the first discharging step, the electrical voltage each of the capacitors 23 provides is sufficiently low such that each of the capacitors 23 is discharged at least to a value below the predefined maximum voltage reference value. The predefined maximum voltage reference value, therefore, ensures that the bleeding resistors 33, which are connected to the capacitors 23 in a closed loop configuration in a second discharging step described further below, can be dimensioned smaller, e.g., in terms of their electrical resistances and geometrical dimensions, particularly, compared to situations in which the discharging of the capacitors 23 is performed solely via bleeding resistors and without performing the inventive first discharging step.

After the first discharging step is performed, a second discharging step is performed. In the second discharging step each resistor switch 35 of the resistor switches 35 assumes the closed state. To perform the second discharging step, the control unit provides control signals to the resistor switches 35, such that each resistor switch 35 of the resistor switches 35 assumes the closed state. Since each resistor switch 35 of the resistor switches 35 assumes the closed state, the resistor switches 35 of each cell 5 connect the capacitor 23 of that cell 5 to the bleeding resistors 33 of that cell 5 in a closed loop configuration, and, thereby discharge the capacitors 23 to a value which is below the predefined minimum voltage reference value and is equivalent to a value which is low enough such that a third discharging step, as described further below, can be performed in a safe manner. By combining the first discharging step and the second discharging step it is possible, as already described, that the bleeding resistors 33 can be dimensioned smaller, e.g., in terms of their electrical resistances and geometrical dimensions, particularly, compared to situations in which the discharging of the capacitors 23 is performed solely via bleeding resistors and without performing the inventive first discharging step. Further, since bleeding resistors 33 with lower electrical resistances can be employed due to the present disclosure, the time constant of the capacitor 23 and the bleeding resistors 33 can be reduced, which decreases the time required to further partially discharge the capacitors 23 during the second discharging step from the electric voltage value at the end of the first discharging step to the electric voltage value at the end of the second discharging step. Thereby, the total time required to discharge all capacitors 23 from the end of the disconnecting step until maintenance work can be performed safely can be significantly reduced.

After the second discharging step is performed, a third discharging step is performed. In the third discharging step each grounding switch 37 assumes the closed state. Particularly, each resistor switch 35 is still in the closed state during the third discharging step. Thereby, the first and second terminals of each capacitor 23 are connected to ground, such that after the third discharging step maintenance work can be performed safely.

As already described, the capacitors 23 are partially discharged in the first discharging step until the electric voltage each capacitor 23 provides is above a predefined minimum voltage reference value and below a predefined maximum voltage reference value. The capacitors 23 of the converter 1 can be partially discharged according to different time schedules.

For example, the capacitors 23 may partially be discharged during the first discharging step according to a first time schedule. The first time schedule may be regarded as an arm-by-arm time schedule.

According to the first time schedule, during a first step, each capacitor 23 of a first arm 3 starts to partially discharge and reaches the partially discharged state, i.e., the state in which the electric voltage of the capacitor 23 is above the predefined minimum voltage reference value and below the predefined maximum voltage reference value. During the first step, the switching elements 21 of the other arms 3 are switched such that the cells 5 of the other arms 3 are in the second state, in which the capacitors 23 of these arms 3 are bypassed. Thereby, during the first step of the first time schedule, the capacitors 23 of the first arm 3 are partially discharged, before the capacitors 23 of the other arms 3 start to partially discharge. During the first step, the capacitors 23 of a respective arm 3 may start to partially discharge simultaneously and reach the partially discharged state simultaneously, may start to partially discharge successively and reach the partially discharged state successively, may start to partially discharge simultaneously and reach the partially discharged state successively, or may start to partially discharge successively and reach the partially discharged state simultaneously. Further, the capacitors 23 of a respective arm 3 may be divided into groups of capacitors 23, wherein each group comprises two or more capacitors 23. During the first step, the groups of the respective arm 3 may start to partially discharge simultaneously and reach the partially discharged state simultaneously, may start to partially discharge successively and reach the partially discharged state successively, may start to partially discharge simultaneously and reach the partially discharged state successively, or may start to partially discharge successively and reach the partially discharged state simultaneously.

According to the first time schedule, during a second step, each capacitor 23 of a second arm 3 starts to partially discharge and reaches the partially discharged state, i.e., the state in which the electric voltage of the capacitor 23 is above the predefined minimum voltage reference value and below the predefined maximum voltage reference value. During the second step, the switching elements 21 of the other arms 3 are switched such that the cells 5 of the other arms 3 are in the second state, in which the capacitors 23 of these arms 3 are bypassed. Thereby, during the second step of the first time schedule, the capacitors 23 of the second arm 3 are partially discharged, after the capacitors 23 of the first arm 3 are partially discharged and before the capacitors 23 of the other arm 3 or arms 3 start to partially discharge. Similarly, during the second step, the capacitors 23 of a respective arm 3 may start to partially discharge simultaneously and reach the partially discharged state simultaneously, may start to partially discharge successively and reach the partially discharged state successively, may start to partially discharge simultaneously and reach the partially discharged state successively, or may start to partially discharge successively and reach the partially discharged state simultaneously. Further, the capacitors 23 of a respective arm 3 may be divided into groups of capacitors 23, wherein each group comprises two or more capacitors 23. During the second step, the groups of the respective arm 3 may start to partially discharge simultaneously and reach the partially discharged state simultaneously, may start to partially discharge successively and reach the partially discharged state successively, may start to partially discharge simultaneously and reach the partially discharged state successively, or may start to partially discharge successively and reach the partially discharged state simultaneously.

In a similar manner, the capacitors 23 of the third arm 3 and possibly the capacitors 23 of further arms 3 are partially discharged such that the arms 3 successively, i.e., one after the other, reach a state in which each capacitor 23 of the respective arm 3 is partially discharged at the end of the first discharging step. The state of an arm 3 in which each capacitor 23 of the respective arm 3 is partially discharged such that the electric voltage each capacitor 23 of the respective arm 3 provides is above the predefined minimum voltage reference value and below the predefined maximum voltage reference value can be regarded as a first state of the arm 3. Further, the state of an arm 3 in which each capacitor 23 of the respective arm 3 has started to partially discharge can be regarded as a second state of the arm 3. If the capacitors 23 are partially discharged during the first discharging step according to the first time schedule, the arms 3 successively reach both the first state and the second state, i.e., a first arm 3 reaches the second state in which each capacitor 23 of the respective arm 3 has started to partially discharge, afterwards, the first arm 3 reaches the first state in which each capacitor 23 of the respective arm 3 is partially discharged such that the electric voltage each capacitor 23 of the respective arm 3 provides is above the predefined minimum voltage reference value and below the predefined maximum voltage reference value, afterwards, a second arm 3 reaches the second state, afterwards, the second arm 3 reaches the first state, afterwards, a third arm 3 reaches the second state, afterwards, the third arm 3 reaches the first state, and, similarly, further arms 3 may reach the first and second states.

Further, the capacitors 23 may, for example, partially be discharged during the first discharging step according to a second time schedule. The second time schedule may be regarded as a cell-by-cell time schedule. For the second time schedule, the capacitors 23 of the arms 3 may be divided into groups of capacitors 23, wherein each group comprises one or more capacitors 23 of each arm 3. Therefore, each group comprises at least one capacitor 23 of each arm 3.

According to the second time schedule, during a first step, each capacitor 23 of a first group starts to partially discharge and reaches the partially discharged state, i.e., the state in which the electric voltage of the capacitor 23 is above the predefined minimum voltage reference value and below the predefined maximum voltage reference value. During the first step, the switching elements 21 of the cells 5 of the other capacitors 23 are switched such that the cells 5 are in the second state, in which the capacitors 23 of these cells 5 are bypassed. Thereby, during the first step of the second time schedule, the capacitors 23 of the first group are partially discharged, before the capacitors 23 of the other groups start to partially discharge. During the first step, the capacitors 23 of the first group may start to partially discharge simultaneously and reach the partially discharged state simultaneously, may start to partially discharge successively and reach the partially discharged state successively, may start to partially discharge simultaneously and reach the partially discharged state successively, or may start to partially discharge successively and reach the partially discharged state simultaneously.

According to the second time schedule, during a second step, each capacitor 23 of a second group starts to partially discharge and reaches the partially discharged state, i.e., the state in which the electric voltage of the capacitor 23 is above the predefined minimum voltage reference value and below the predefined maximum voltage reference value. During the second step, the switching elements 21 of the cells 5 of the other capacitors 23 are switched such that the cells 5 are in the second state, in which the capacitors 23 of these cells 5 are bypassed. Thereby, during the second step of the second time schedule, the capacitors 23 of the second group are partially discharged, after the capacitors 23 of the first group are partially discharged and before the capacitors 23 of the other group or groups start to partially discharge. Similarly, during the second step, the capacitors 23 of the second group may start to partially discharge simultaneously and reach the partially discharged state simultaneously, may start to partially discharge successively and reach the partially discharged state successively, may start to partially discharge simultaneously and reach the partially discharged state successively, or may start to partially discharge successively and reach the partially discharged state simultaneously.

As described above, during the first step of the second time schedule, the capacitors 23 of the first group are partially discharged, before the capacitors 23 of the other groups start to partially discharge, and the capacitors 23 of the second group are partially discharged, after the capacitors 23 of the first group are partially discharged and before the capacitors 23 of the other group or groups start to partially discharge. Similarly, if multiple further groups are provided, the groups successively reach a state in which the capacitors 23 of the individual groups are partially discharged and the capacitors 23 of each group only start to partially discharge once the capacitors 23 of the previous group are partially discharged. In this case, the second time schedule may be regarded as a cell-by-cell non-overlapping time schedule.

Alternatively, it may also be the case that during the first step of the second time schedule, the capacitors 23 of the first group are partially discharged until the electric voltage each capacitor 23 of the first group provides matches a predefined voltage reference value above the predefined maximum voltage reference value, and the capacitors 23 of the second group start to partially discharge once the electric voltage each capacitor 23 of the first group provides matches the predefined voltage reference value. Similarly, the capacitors 23 of the second group are partially discharged until the electric voltage each capacitor 23 of the second group provides matches a predefined voltage reference value above the predefined maximum voltage reference value, and the capacitors 23 of a third group start to partially discharge once the electric voltage each capacitor 23 of the second group provides matches the predefined voltage reference value. Similarly, further groups may start to partially discharge 23 their capacitors 23 successively, before the capacitors 23 of the previous group have reached the partially discharged state. In this case, the second time schedule may be regarded as a cell-by-cell overlapping time schedule.

Particularly, due to the different time schedules during the first discharging step in combination with the first, second and third discharging steps, the present disclosure provides the possibility of specifically selecting different time periods for discharging all capacitors 23 from the end of the disconnecting step until maintenance work can be performed safely. Thereby, different time requirements for discharging all capacitors 23 from the end of the disconnecting step until maintenance work can be performed safely can be achieved.

It is additionally pointed out that "comprising" does not rule out other elements, and "a" or "an" does not rule out a multiplicity. It is also pointed out that features that have been described with reference to one of the above exemplary embodiments may also be disclosed as in combination with other features of other exemplary embodiments described above. Reference signs in the claims are not to be regarded as restrictive.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 converter
3 arm
5 cell
7 inductor
9 first arm terminal
11 second arm terminal
13 AC (alternating current) terminal
15 DC (direct current) terminal
17 first cell terminal
19 second cell terminal
21 switching element
23 capacitor
27 bypass unit
29 insulated-gate bipolar transistor (IGBT)
31 diode
33 bleeding resistor
35 resistor switch
37 grounding switch

The invention claimed is:

1. A converter, the converter comprising:
a plurality of arms; and
a controller coupled to the plurality of arms,
wherein each of the arms comprises:
a first arm terminal;
a second arm terminal; and
a plurality of cells coupled between the first arm terminal and the second arm terminal,
wherein each of the cells comprises: a first cell terminal, a second cell terminal, switching elements, and a capacitor,
wherein the switching elements of each of the cells are adapted to selectively switch the respective cell between a first state, in which the capacitor is connected to the first cell terminal and second cell terminal, and a second state, in which the capacitor is bypassed, and
wherein the cells are connected in series between the first arm terminal and the second arm terminal such that the first cell terminal of a first cell of the plurality of cells is connected to the first arm terminal and the second cell terminal of a second cell of the plurality of cells is connected to the second arm terminal, and
wherein the controller is adapted to selectively operate in a mode in which the controller provides control signals to the switching elements to repeatedly switch each of the cells between the first state and second state in such a manner that the electric current in each of the arms is adjusted to match a respective predefined current reference value and that the capacitors are partially discharged until the electric voltage each capacitor provides is above a predefined minimum voltage reference value and below a predefined maximum voltage reference value.

2. The converter according to claim 1, wherein each of the arms further comprises an inductor, wherein the inductor is coupled between the first arm terminal of the respective arm and the plurality of cells of the respective arm and the first cell terminal of the first cell of the plurality of cells of the respective arm is indirectly connected to the first arm terminal via the inductor or the inductor is coupled between the second arm terminal of the respective arm and the plurality of cells of the respective arm and the second cell terminal of the second cell of the plurality of cells of the respective arm is indirectly connected to the second arm terminal via the inductor.

3. The converter according to claim 1, the converter further comprising disconnecting switches, wherein each disconnecting switch of the disconnecting switches is adapted to assume a closed state, in which the disconnecting switch connects a respective first arm terminal or a respective second arm terminal to a terminal of an electrical grid, and is adapted to assume an open state, in which the disconnecting switch disconnects the respective first arm terminal or the respective second arm terminal from the terminal of the electrical grid, such that, in case each disconnecting switch of the disconnecting switches assumes the open state, no terminal of the electrical grid is connected to any of the first arm terminals or second arm terminals.

4. The converter according to claim 1, wherein the arms are configured to be controlled to successively reach a first state in which each capacitor of the respective arm is partially discharged such that the electric voltage each capacitor of the respective arm provides is above the predefined minimum voltage reference value and below the predefined maximum voltage reference value.

5. The converter according to claim 4, wherein the arms are configured to be controlled to successively reach a second state in which each capacitor of the respective arm has started to partially discharge, wherein the arms successively reach both the first state and the second state.

6. The converter according to claim 1, wherein the cells are configured to be controlled to successively reach a third state in which the capacitor of the respective cell is partially discharged such that the electric voltage the capacitor provides is above the predefined minimum voltage reference value and below the predefined maximum voltage reference value.

7. The converter according to claim 1, the converter further comprises bleeding resistors and resistor switches, wherein for each cell at least one of the resistor switches is adapted to assume a closed state, in which the at least one resistor switch connects the capacitor of the cell to at least one bleeding resistor in a closed loop configuration, and is adapted to assume an open state, in which the at least one resistor switch disconnects the capacitor of the cell from the at least one bleeding resistor.

8. The converter according to claim 7, wherein the controller is adapted to provide control signals to the resistor switches, such that each resistor switch of the resistor switches assumes the closed state after each of the arms has reached the first state.

9. The converter according to claim 1, the converter further comprises at least one grounding switch, wherein each grounding switch of the at least one grounding switch is adapted to assume a closed state, in which the grounding switch connects the capacitors of at least one of the arms to ground or enables the capacitors of the at least one arm to be connected to ground, and is adapted to assume an open state, in which the grounding switch disconnects the capacitors of the at least one arm from ground, such that, in case each grounding switch of the grounding switches assumes the closed state, each of the capacitors of the arms are connected to ground or are enabled to be connected to ground.

10. The converter according to claim 9, wherein the controller is adapted to provide control signals to the at least one grounding switch, such that each grounding switch of the at least one grounding switch assumes the closed state after each resistor switch of the resistor switches has assumed the closed state.

11. The converter according to claim 1, wherein the plurality of arms are connected to each other such that each arm is connected to at least one of the other arms such that the arm forms a closed loop configuration together with the at least one of the other arms.

12. A method for controlling the converter according to claim 1, the method comprising:

a first discharging step, in which each of the cells is repeatedly switched between the first state and second state in such a manner that the electric current in each of the arms is adjusted to match the respective predefined current reference value and that the capacitors are partially discharged until the electrical voltage each capacitor provides is above the predefined minimum voltage reference value and below the predefined maximum voltage reference value.

13. The method according to claim 12, the method further comprising a second discharging step, in which each resistor switch of the resistor switches assumes the closed state after each of the arms has reached the first state.

14. The method according to claim 13, the method further comprising a third discharging step, in which each grounding switch assumes the closed state after each resistor switch has assumed the closed state.

* * * * *